(12) United States Patent
Liu et al.

(10) Patent No.: US 11,619,650 B1
(45) Date of Patent: Apr. 4, 2023

(54) METHOD OF PREPARING A SPECIMEN FOR SCANNING CAPACITANCE MICROSCOPY

(71) Applicant: MSSCORPS CO., LTD., Hsinchu (TW)

(72) Inventors: Chi-Lun Liu, Hsinchu (TW); Hui-Ni Huang, Hsinchu (TW); Chia-Ling Chen, Hsinchu (TW); Shihhsin Chang, Hsinchu (TW)

(73) Assignee: MSSCORPS CO., LTD., Hsinchu (TW)

(*) Notice: Subject to any disclaimer, the term of this patent is extended or adjusted under 35 U.S.C. 154(b) by 0 days.

(21) Appl. No.: 17/700,835

(22) Filed: Mar. 22, 2022

(30) Foreign Application Priority Data

Sep. 28, 2021 (TW) ................................. 110135939

(51) Int. Cl.
*G01Q 30/20* (2010.01)
*G01Q 60/46* (2010.01)
(52) U.S. Cl.
CPC ............. *G01Q 30/20* (2013.01); *G01Q 60/46* (2013.01)
(58) Field of Classification Search
CPC ................................. G01Q 30/20; G01Q 60/46
USPC ........................................................... 850/18
See application file for complete search history.

(56) References Cited

U.S. PATENT DOCUMENTS

| 5,633,502 A | * | 5/1997 | Fischione | ................ G01N 1/32 315/111.21 |
| 2001/0052257 A1 | * | 12/2001 | Magerle | ................ G01Q 30/20 73/105 |
| 2013/0052420 A1 | * | 2/2013 | Jenkins | ............... B01D 39/1692 210/500.1 |

* cited by examiner

*Primary Examiner* — Nicole M Ippolito

(57) ABSTRACT

The present invention discloses a method of preparing a specimen for scanning capacitance microscopy, comprising the steps of: providing a sample including at least one object to be analyzed; manually grinding the sample from an edge of the sample toward a target region containing the object to be analyzed gradually, and stopping at a distance of dl from a longitudinal section of the at least one object to be analyzed in the target region to form a grinding stopping surface; cutting the grinding stopping surface by a plasma focused ion beam equipped with a scanning electron microscopy toward the target region and stopping at a distance of d2 from the longitudinal section to form a cutting stopping surface, wherein 0<d2<d1; and manually grinding to polish the cutting stopping surface and gradually remove the part of the sample between the longitudinal section and the cutting stopping surface to expose the longitudinal section of the at least one object to be analyzed, and complete the preparation of a specimen for scanning capacitance microscopy.

7 Claims, 7 Drawing Sheets

100

I    110                                            I'

METHOD OF PREPARING A SPECIMEN FOR SCANNING CAPACITANCE MICROSCOPY

This application claims the benefit of Taiwanese application serial No. 110135939, filed on Sep. 28, 2021, the subject matter of which is incorporated herein by reference.

BACKGROUND OF THE INVENTION

Field of the Invention

The invention relates in general to a method of preparing a specimen, and in particular to a method of preparing a semiconductor specimen for scanning capacitance microscopy.

Description of the Related Art

Scanning Capacitance Microscopy (SCM) is one of the important tools to obtain the dopant distribution of the structure of interest such as the transistor or the diode to be analyzed, so it has been widely used in the IC manufacturing process and IC failure analysis. In order to have the dopant spatial distribution, the samples must be prepared in the form of cross-section. At present, the preparation method is manual grinding, and an optical microscopy is utilized to confirm the position of the specimen. However, the grinding accuracy and the resolution of the optical microscopy have their limitations. For the specimen with a larger structural sizes, the controllability of grinding is not a problem; however, when the structural sizes of the specimen are further reduced to close to or even exceed the resolution of the optical microscopy, the confidence in preparing of cross-sectional samples will be significantly reduced and the difficulty will become more and more difficult, not to mention if grinding to a specific analytic position is required.

FIG. 1A is a top view of a sample to be analyzed 100. As shown in FIG. 1A, the sample to be analyzed 100 has a plurality of cylindrical objects to be analyzed 110. FIG. 1B is a cross-sectional view taken along the cross-section line I-I' of FIG. 1A, and FIG. 1C is a partial enlarged cross-sectional view of the cylindrical object to be analyzed 110 shown in FIG. 1B. As shown in FIG. 1C, each of the cylindrical objects to be analyzed 110 has both a N-type doping region and a P-type doping region, and the dopant spatial distribution can be analyzed by a scanning capacitance microscopy. When the cross-sectional plane to be analyzed by scanning capacitance microscopy is positioned at the center of the cylindrical objects to be analyzed 110, a better and accurate result close to the actual situation can be obtained.

The traditional manual grinding method, as shown in FIG. 2A, is ground (upward) towards the target zone 130 containing the cylindrical objects to be analyzed 110 from one side (lower side) 100A of the sample to be analyzed 100. Human bare eyes are used with the help of the optical microscopy to determine whether the grinding surface is level or not, and it is constantly corrected back and forth during the grinding process. However, the grinding usually results in an unavoidable slight error angle θ relative to the horizontal line X (θ<2°) because the judgment is usually limited by the human bare eyes.

As shown in FIG. 2B, a cross-sectional view along the section line II-II' of FIG. 2A, the manual grinding results in an error angle θ, and the final grinding section of the object of analysis 110 will be uneven. If the structure size of the target object 110 to be analyzed is small and in the present of the grinding error angle, it is very likely that the cylindrical shape in the target area 130 to be analyzed will not be allowed to be analyzed by scanning capacitance microscopy since the first grinding stop surface 171 shown in FIG. 2A obtained by manual grinding cannot be accurately controlled, or the cylindrical shape in the target area 130 to be analyzed will not be allowed to be re-analyzed by scanning capacitance microscopy since the second grinding stop surface 172 shown in FIG. 2A is over-ground. Moreover, even the grinding stop surface is located between the first grinding stop surface 171 and the second grinding stop surface 172, the structural cross-section of the cylindrical object to be analyzed 110 in the target area 130 to be analyzed will still not be in the center position of the cylindrical object to be analyzed 110. Therefore, correct results by scanning capacitance microscopy analysis are unavailable. In view of this, a method for preparing a specimen for scanning capacitance microscopy which can precisely and effectively control the final cross-sectional position (including the level) is highly expected by the industry.

SUMMARY OF THE INVENTION

This invention provides a method of preparing a specimen for scanning capacitance microscopy, comprising the steps of: providing a sample including at least one object to be analyzed; manually grinding the sample from an edge of the sample toward a target region containing the object to be analyzed gradually, and stopping at a distance of d1 from a longitudinal section of the at least one object to be analyzed in the target region to form a grinding stopping surface; cutting the grinding stopping surface by a plasma focused ion beam equipped with a scanning electron microscopy toward the target region and stopping at a distance of d2 from the longitudinal section to form a cutting stopping surface, wherein 0<d2<d1; and manually grinding to polish the cutting stopping surface and gradually remove the part of the sample between the longitudinal section and the cutting stopping surface to expose the longitudinal section of the at least one object to be analyzed, and complete the preparation of a specimen for scanning capacitance microscopy.

The above-mentioned method of preparing a specimen for scanning capacitance microscopy as claimed in claim 1, wherein the object to be analyzed is a semiconductor device, for example but not limited to a transistor or a diode.

The above-mentioned method of preparing a specimen for scanning capacitance microscopy as claimed in claim 1, wherein the plasma focused ion beam is a plasma focused ion beam using an Noble gas as an ion source thereof, for example but not limited to helium, neon, argon or krypton.

The above-mentioned method of preparing a specimen for scanning capacitance microscopy as claimed in claim 1, wherein 0.1 μm≤d1≤0.2 μm.

The above-mentioned method of preparing a specimen for scanning capacitance microscopy as claimed in claim 6, wherein 5 μm≤d2≤10 μm.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operation the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings the structure of the apparatus known only schematically depicted in figures.

Embodiment

Please refer to FIGS. 3A-3F, which illustrate top view, cross-sectional view and local-enlarged cross-sectional view of a method of preparing a specimen for scanning capacitance microscopy according to this present invention.

Figure 1A:
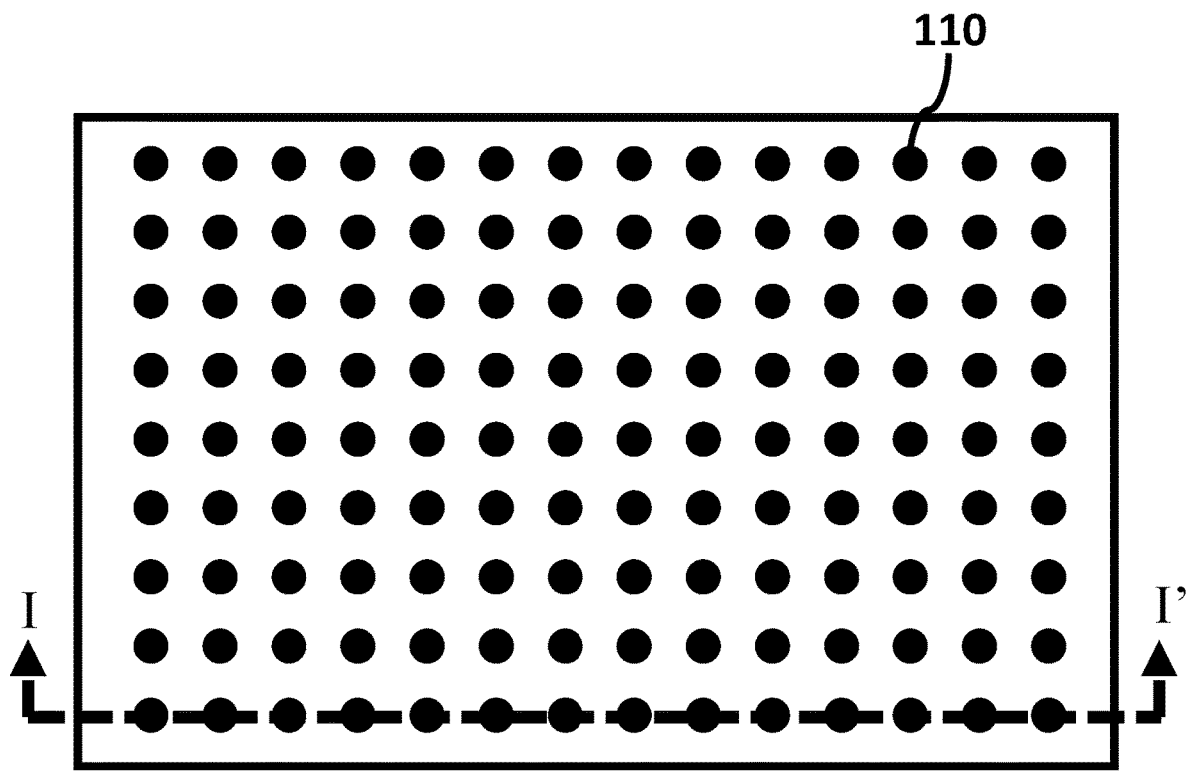
FIGS. 1A-1C are top-view, cross-sectional view and local-enlarged cross-sectional view of a sample to be analyzed.
Figure 1B:
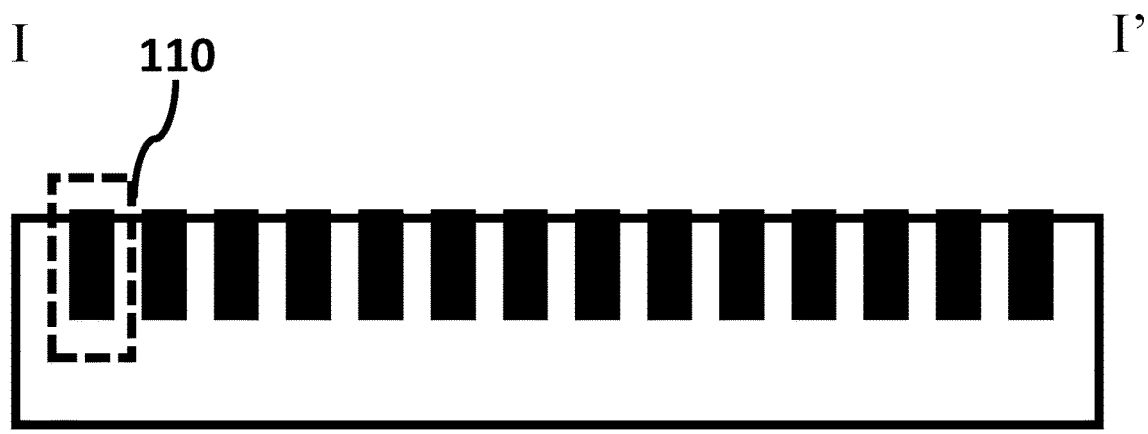
Figure 1C:
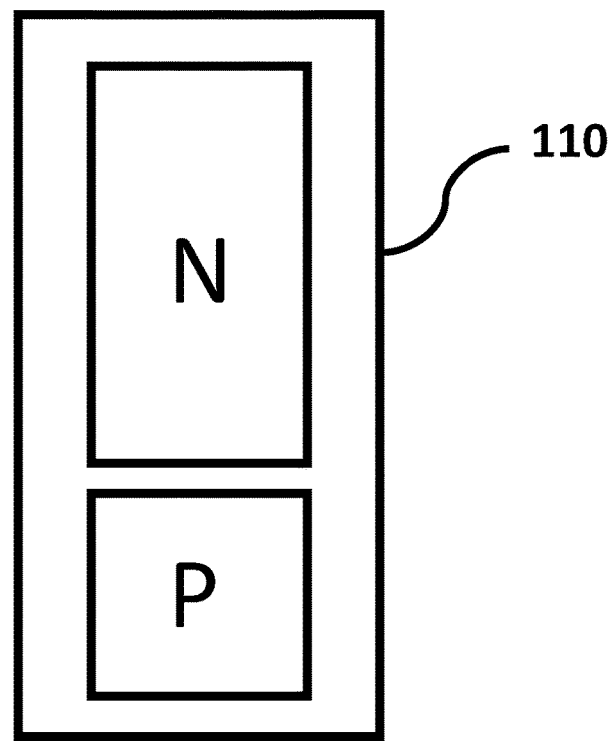
Figure 2A:
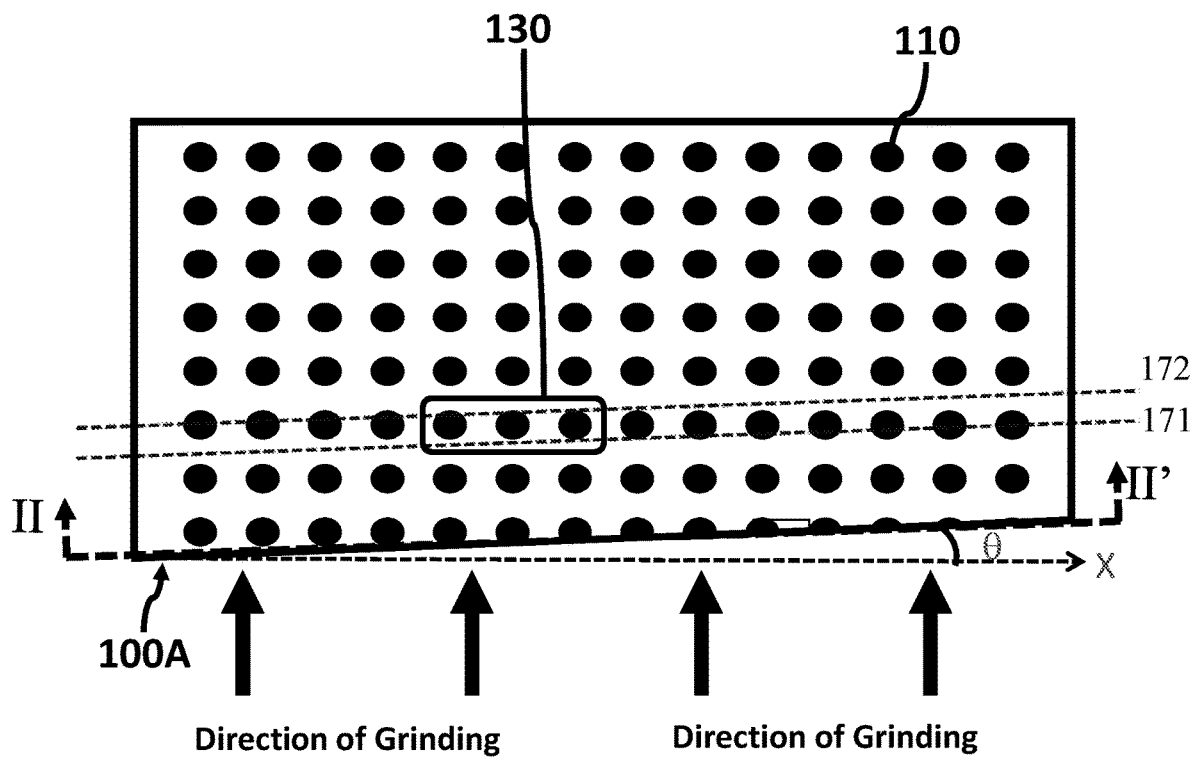
FIGS. 2A-2B are top view and cross-sectional view of a conventional method of preparing a specimen for scanning capacitance microscopy.
Figure 2B:
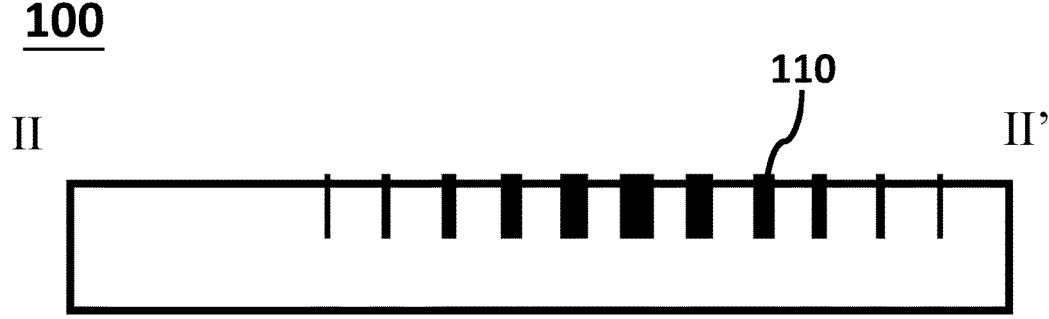
Figure 3A:
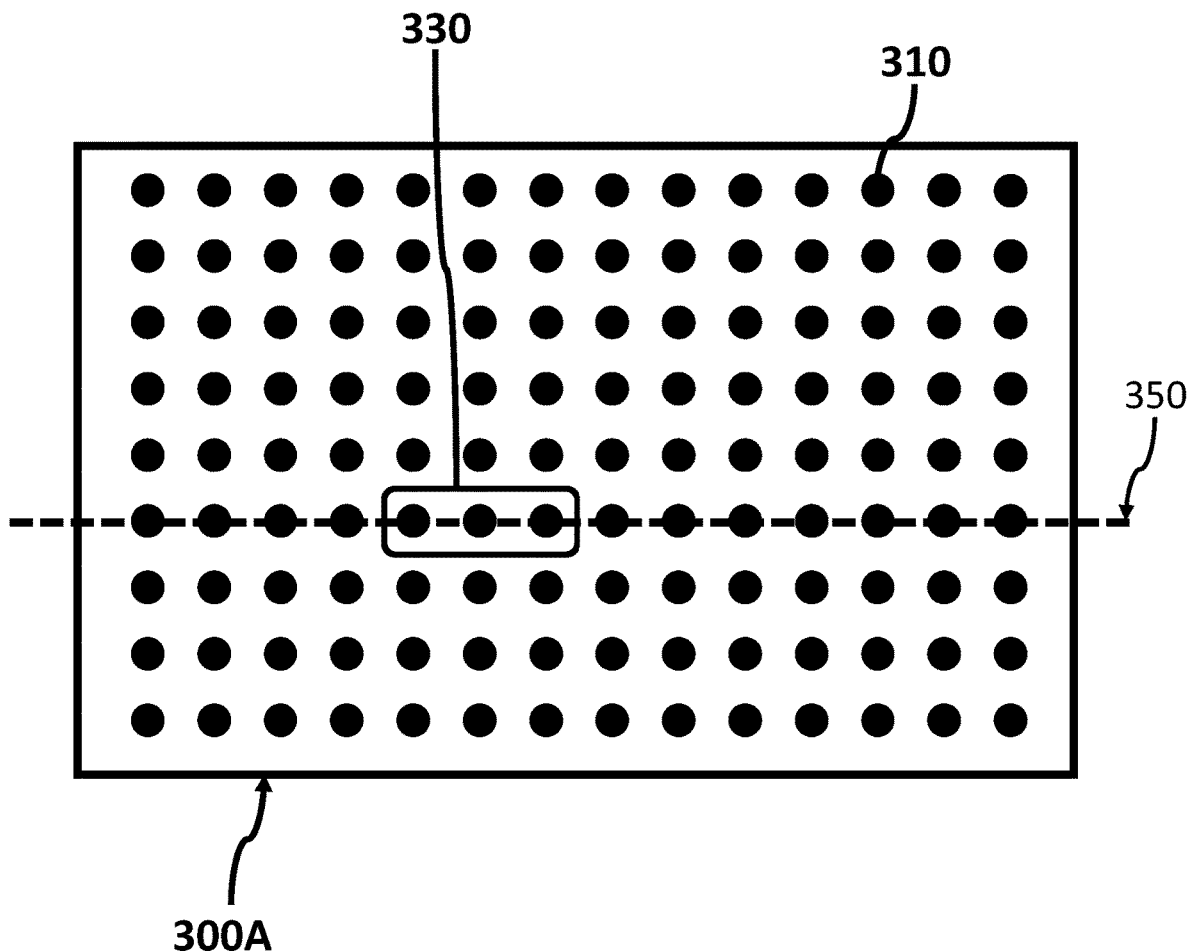
FIGS. 3A-3F are top view, cross-sectional view and local-enlarged cross-sectional view of a method of preparing a specimen for scanning capacitance microscopy according to this present invention.

First, please refer to FIG. 3A, a sample 300 was provided. The sample 300 comprise a target region 330 containing at least one object to be analyzed 310, wherein the structure of the at least one object to be analyzed 310 can be for example but not limited to a triangular pyramid, a pyramid, a tetragonal prism or a fin. The at least one object to be analyzed 310 according to this embodiment is a semiconductor device for example but not limited to a transistor or a diode.

Figure 3B:
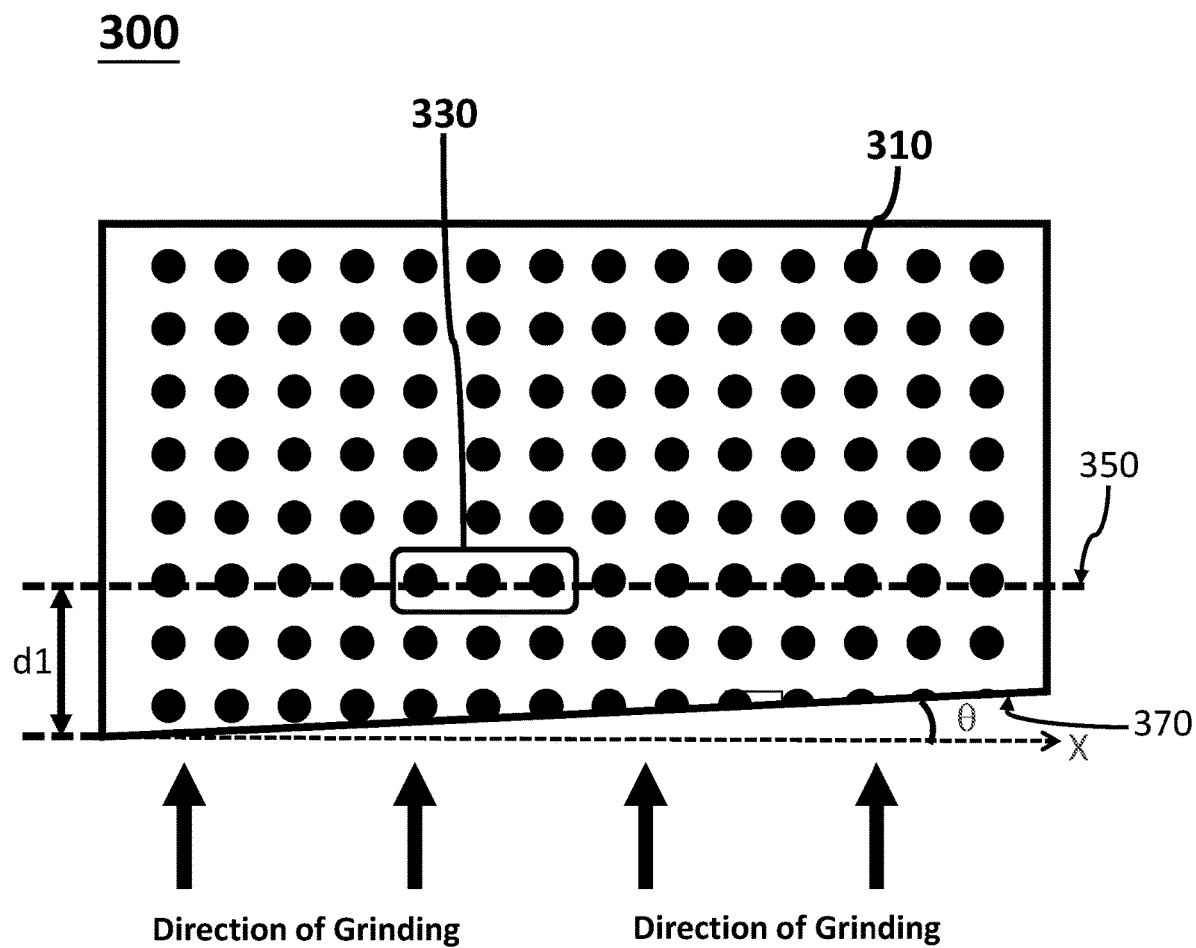

Next, please refer to FIGS. 3A and 3B, the sample 300 was manually grinding from an edge 300A of the sample 300 toward the target region 330 containing the at least one object to be analyzed 310 gradually, and stopping at a distance of d1 from a longitudinal section 350 positioned at the center of the at least one object to be analyzed 310 in the target region 330 to form a grinding stopping surface 370 as shown in FIG. 3B, wherein 5 µm≤d1≤10 µm. During the manual grinding step, human bare eyes were used with the help of the optical microscopy to determine whether the grinding surface was level or not and constantly correct back and forth. Therefore, an unavoidable slight error angle θ relative to the horizontal line X (θ<2°) was obtained because of limited determination made by human bare eyes.

Figure 3C:
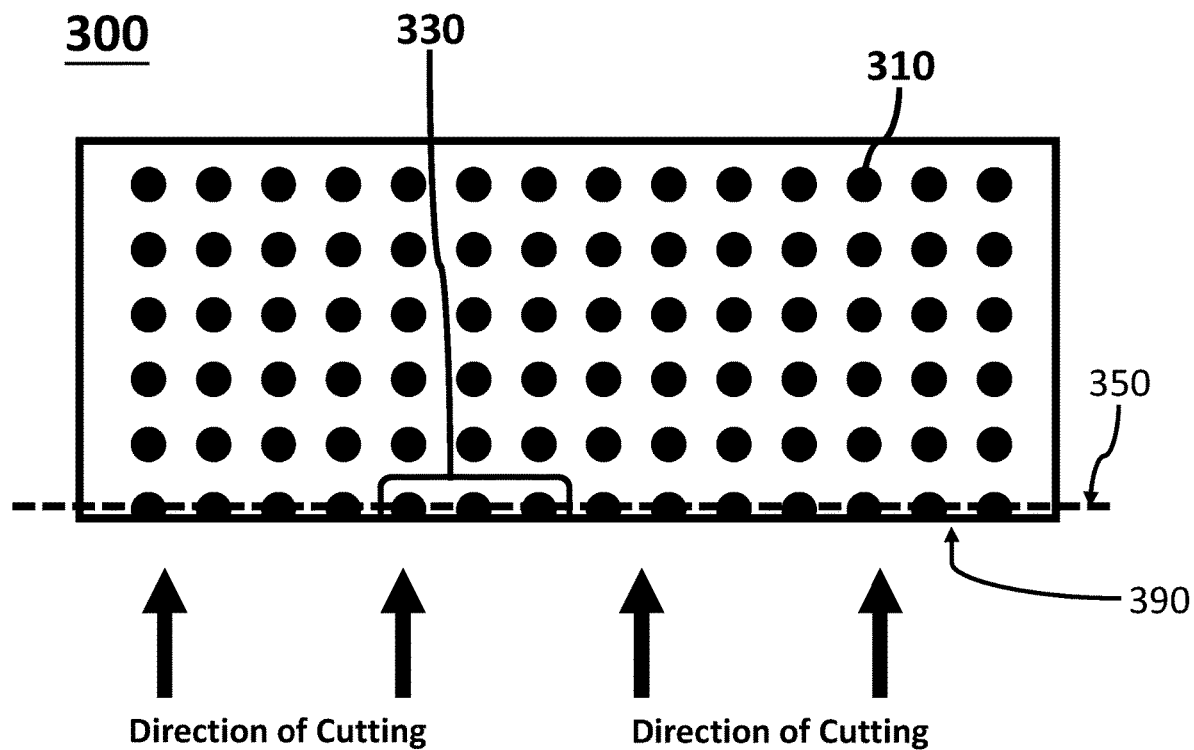
Figure 3D:
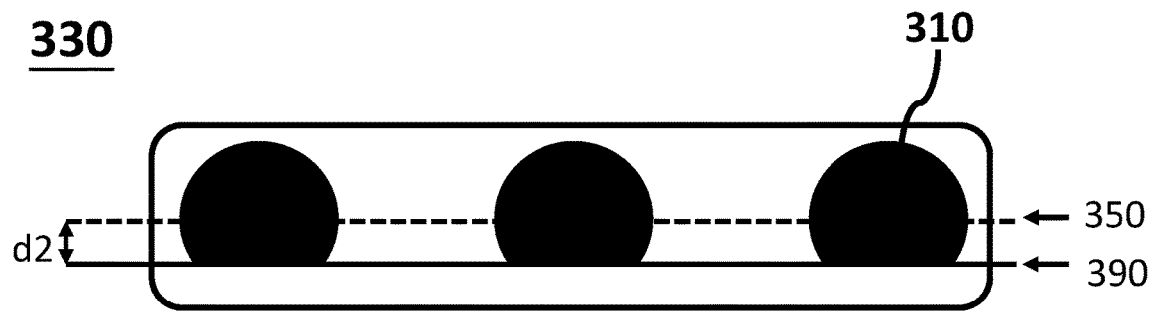

Next, please refer to FIGS. 3B-3D. The grinding stopping surface 370 shown in FIG. 3B was cut by a plasma focused ion beam (PFIB) equipped with a scanning electron microscope (not shown) toward the target region 330 to form a cutting stopping surface 390 as shown in FIGS. 3C and 3D by stopping cutting at a distance of d2 from the longitudinal section 350. As the local-enlarged cross-sectional view shown in FIG. 3D, the distance between the longitudinal section 350 and the cutting stopping surface 390 is d2, wherein 0<d2<d1 and 0.1 µm≤d2≤0.2 µm. The slight error angle θ shown in FIG. 3B caused by the manual grinding process was corrected to almost zero (parallel to the horizontal line X) by the plasma focused ion beam cutting, and the obtained cutting stopping surface 390 was parallel to the structural center of the object to be analyzed 310 in the target area 330 to be analyzed. The plasma focused ion beam (PFIB) of this embodiment was a plasma focused ion beam (PFIB) utilizing an Noble gas such as neon or argon as the ion source.

Figure 3E:
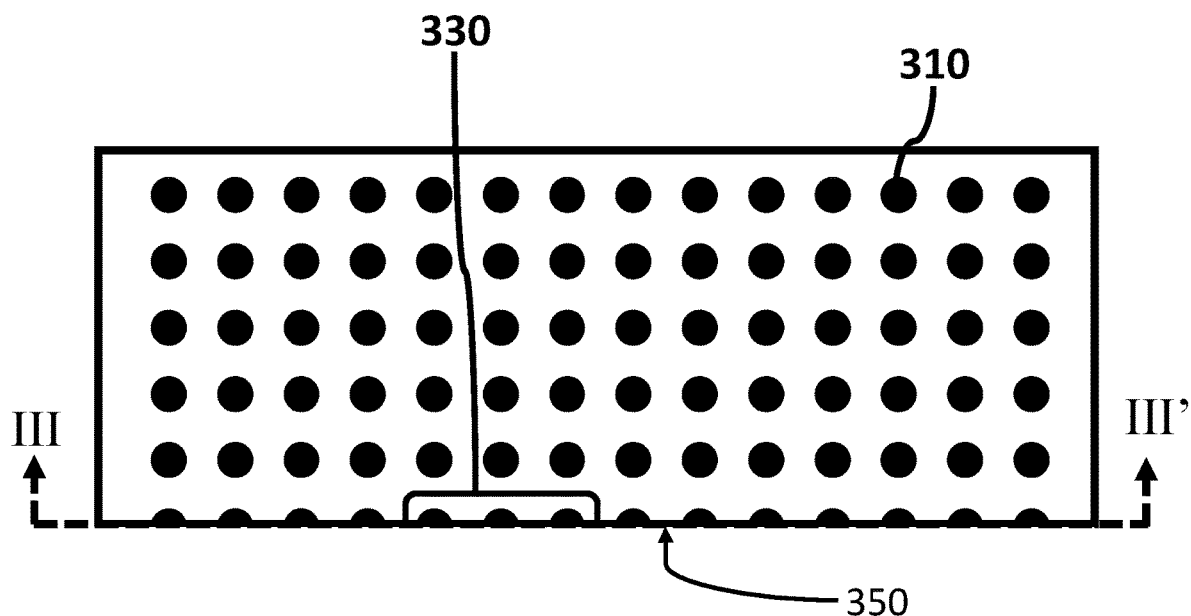
Figure 3F:
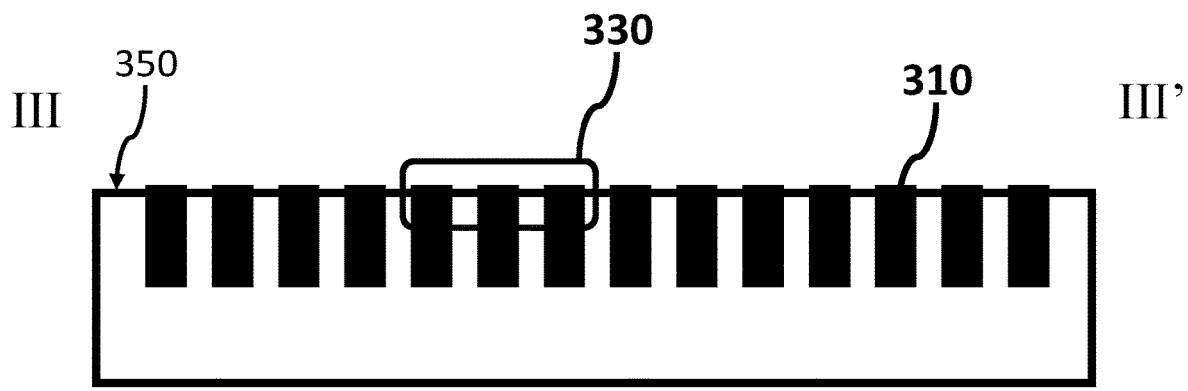

Finally, please refer to FIGS. 3E-3F. the cutting stopping surface 390 shown in FIG. 3D was manually ground to polish and gradually remove the part of the sample between the longitudinal section 350 and the cutting stopping surface 390 to expose the longitudinal section 350 of the object to be analyzed 310 and complete the preparation of a specimen 500 for scanning capacitance microscopy. The structure of the object to be analyzed 310 in the target area 330 can be further analyzed through the exposed longitudinal section 350 of the object to be analyzed 310 by scanning capacitance microscopy.

The present invention utilizes a plasma-type focused ion beam using an Noble gas as the ion source, and starts cutting (propulsion from bottom to top) toward to the target area from the manual grinding stop surface. There are two main advantages by using an Noble gas as the ion source: a) Noble gases do not have concerns about changing the cross-sectional properties (such as electrical properties) of the structure to be analyzed like traditional focused ion beam metal ion sources, such as gallium ions ($Ga^+$) do, and b) because Noble gas ions have larger atomic radiuses and masses than those of gallium ions, so the cutting volume (width and depth) of the Noble gas ions is 5-6 times (width can exceed 200 µm) of the traditional focused ion beam, therefore a larger area of cross section can be prepared. As a result, the plasma focused ion beam and the scanning electron microscope with several nanometers of spatial resolution can effectively eliminate the original grinding error angle caused by manual grinding through more accurate horizontal positioning, and a specimen with a better sectional quality and completely preserved target area can be prepared comparing to that preparing by conventional manual grinding.

To sum up, according to the method for preparing a specimen for scanning capacitance microscopy disclosed in the present invention, by combining manual grinding and plasma focused ion beam (Plasma focused ion beam, PFIB) technology, the section preparation can be effectively improved The accuracy and success rate can be achieved, and it can perform scanning capacitance microscopy analysis on a specific point that cannot be easily achieved by traditional methods.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A method of preparing a specimen for scanning capacitance microscopy, comprising the steps of:
   providing a sample including at least one object to be analyzed;
   manually grinding the sample from an edge of the sample toward a target region containing the object to be analyzed gradually, and stopping at a distance of d1 from a longitudinal section of the at least one object to be analyzed in the target region to form a grinding stopping surface;
   cutting the grinding stopping surface by a plasma focused ion beam equipped with a scanning electron microscopy toward the target region and stopping at a distance of d2 from the longitudinal section to form a cutting stopping surface, wherein 0<d2<d1; and manually grinding to polish the cutting stopping surface and gradually remove the part of the sample between the longitudinal section and the cutting stopping surface to expose the longitudinal section of the at least one object to be analyzed, and complete the preparation of a specimen for scanning capacitance microscopy.

2. The method of preparing a specimen for scanning capacitance microscopy as claimed in claim 1, wherein the object to be analyzed is a semiconductor device.

3. The method of preparing a specimen for scanning capacitance microscopy as claimed in claim 2, wherein the semiconductor device is a transistor or a diode.

4. The method of preparing a specimen for scanning capacitance microscopy as claimed in claim 1, wherein the plasma focused ion beam is a plasma focused ion beam using an Noble gas as an ion source thereof.

5. The method of preparing a specimen for scanning capacitance microscopy as claimed in claim 4, wherein the Noble gas is helium, neon, argon or krypton.

6. The method of preparing a specimen for scanning capacitance microscopy as claimed in claim 1, wherein $0.1 \mu m \leq d1 \leq 0.2 \mu m$.

7. The method of preparing a specimen for scanning capacitance microscopy as claimed in claim 6, wherein $5 \mu m \leq d2 \leq 10 \mu m$.

\* \* \* \* \*